United States Patent Office 2,726,239
Patented Dec. 6, 1955

2,726,239

METHOD OF PRODUCING RIBOFLAVIN SOLUTIONS OF INCREASED STABILITY

Philip E. Brumfield, Terre Haute, Ind., assignor to Commercial Solvents Corporation, Terre Haute, Ind., a corporation of Maryland No Drawing. Application April 9, 1954,
Serial No. 422,260

7 Claims. (Cl. 260—211.3)

My invention relates to a method for producing supersaturated aqueous solutions of riboflavin stabilized against crystallization and for increasing the degree of supersaturation of such solutions.

Riboflavin or vitamin $B_2$ has been found to be necessary in humans and animals to insure growth and continuous good health. Riboflavin is now generally produced by the action of certain microorganisms on liquid nutrient media from which it is then recovered and purified by a variety of procedures. Riboflavin is prepared in many forms for administration to both humans and animals. It may be administered as a solid tablet, a liquid concentrate for oral ingestion, and as a parenteral solution. Riboflavin is frequently combined with a large group of other vitamin substances and administered as multivitamin tablets, capsules, or liquid concentrates for oral ingestion. In preparing these various forms it is frequently desirable to prepare large volumes of aqueous solutions of riboflavin in concentrations greater than those normally obtainable due to the extremely low solubility of riboflavin in water. It is necessary that these large volumes of solutions remain quite clear and retain the riboflavin completely in solution for periods of up to 24 hours for some purposes, due to the necessity of mixing with the riboflavin solutions the other vitamin substances to be administered concurrently therewith. Therefore, the pharmaceutical and feed supplement industries have long desired a satisfactory method of preparing aqueous solutions of riboflavin in concentrations greater than those normally obtainable in water which will retain the riboflavin entirely in solution for periods of up to 24 hours. I have now discovered a method which meets these requirements.

My discovery consists of a method of producing supersaturated aqueous solutions of riboflavin of increased stability against crystallization at an increased degree of supersaturation which comprises dissolving riboflavin at a temperature not in excess of 35° C., in an aqueous solution of a base selected from the group consisting of alkali metal hydroxides, ammonium hydroxide, and aliphatic amines, said base being used in a concentration at which substantial destruction of riboflavin does not take place, said riboflavin being dissolved in an amount sufficient to produce a concentration of from 150% to 1000% by weight, based on the weight of riboflavin in a saturated solution thereof in water at 25° C., then adjusting the pH of the said solutions with an acid to a pH value of from about 3.0 to about 6.5, and maintaining the said supersaturated solution at a temperature of from about 20° to about 35° C., whereby the tendency of the riboflavin to crystallize from the aqueous solution is substantially reduced.

Riboflavin of any of the three known crystal forms can be rendered substantially more stable at increased degrees of supersaturation by employing my method. That is, the riboflavin used can be any one of the three different crystal forms, type A, type B, and type C, which are described and identified in U. S. P. 2,603,633 by Julian K. Dale. There is, however, a difference in the degree of supersaturation which can be obtained by using the different crystal forms. Type A riboflavin, which normally is soluble in water, after vigorous shaking and standing, to a concentration range of from about 80 to 150 mgs. per liter at 25° C., can be used to produce supersaturated solutions of riboflavin of from about 800 to about 1200 mgs. per liter by my process, and, furthermore, these supersaturated solutions will remain clear and uncrystallized for periods of from about 6 hours to as much as 72 hours. Type B riboflavin, which normally is soluble in water, after vigorous shaking and standing, to a concentration range of from about 200 to 300 mgs. per liter at 25° C., can be used to produce supersaturated solutions of riboflavin of from about 600 to 800 mgs. per liter which will remain clear and uncrystallized for from 6 to 24 hours by my process. Type B riboflavin crystals are produced by neutralizing a dilute solution of riboflavin containing from about 2 to about 5 grams per liter and thereafter allowing the solution to stand at room temperature until crystallization is complete.

Type C, the most soluble crystal form of riboflavin, is soluble immediately after vigorous shaking to a concentration range of from about 600 to about 1200 mgs. per liter differing markedly from batch to batch. Upon standing for from one-half to one and one-half hours, however, these type C riboflavin solutions show a saturated concentration range of only from about 200 to 300 mgs. per liter when any crystalline riboflavin is present. By the use of my process, supersaturated solutions of type C riboflavin can be produced in concentrations of from about 800 to about 1200 mgs. per liter which are stable for from 6 to 24 hours. That is, those batches of type C riboflavin which, as produced, were soluble at concentrations of approximately 600 mgs. per liter for periods of from 30 to 90 minutes can be treated so as to produce saturated aqueous solutions of approximately 800 mgs. per liter stable against crystallization for periods of from about 6 to 24 hours. In the same manner, those batches of type C riboflavin originally soluble at concentrations as great as 1200 mgs. per liter for less than 30 minutes, can be used to produce supersaturated solutions of approximately 1200 mgs. per liter stable against crystallization for from 6 to 24 hours by employing my process.

The aqueous alkaline solution employed in my method can be an aqueous solution of any base which will dissolve riboflavin in amounts greater than 1 gram per liter of solution. Alkali metal hydroxides are particularly adaptable for this purpose since very dilute solutions of these hydroxides readily dissolve many times the required quantities of riboflavin. When employing an alkali metal hydroxide solution, I prefer to use from about a 0.01 N to about a 0.1 N solution. Higher concentrations can also be used, taking care only not to use a concentration so high as to decompose the riboflavin dissolved. I have found that a 5.0 N solution of sodium hydroxide can safely be used in my process.

Solutions of ammonium hydroxide and aliphatic amines also function in my process. When employing solutions of these bases, I prefer to use from about 0.05 N to about 1.0 N solutions. Higher concentrations of these bases can be used without danger of decomposing the dissolved riboflavin so long as the temperature of the riboflavin solution at no time exceeds 35° C.

Acids which can be employed in my method to acidify the alkaline solution of riboflavin include any acids, organic or inorganic, which do not form insoluble salts. I prefer to use acetic or hydrochloric acid.

The method of my invention consists of dissolving at a temperature of not more than 35° C. an amount of riboflavin sufficient to give a concentration of from 150% to 1000% by weight, based on the weight of riboflavin at saturation in water at 25° C., in a dilute aqueous alkaline solution at a concentration not destructive of riboflavin. Any solid extraneous matter which is insoluble after stirring is thereupon filtered from the solution. The filtrate is then adjusted to a pH from about 3.0 to 6.5, preferably from about 3.2 to about 4.5 with a concentrated or diluted acid which does not produce insoluble precipitates with the impurities present in recovered riboflavin, such as acetic acid or hydrochloric acid. The acidified filtrate can then be held for a period of from about 6 to about 24 hours at temperatures ranging from about 20° C. to about 35° C. and will remain free of crystals throughout this period.

To carry out my process successfully the riboflavin solutions after acidification must be sparkingly clear, must not be in contact with any riboflavin crystals, and must not be Seitz filtered. If a crystal is placed in contact with a supersaturated solution, crystallization will occur immediately. If the solutions are Seitz filtered the excess riboflavin in the solution will begin to crystallize in a very short time.

My invention is useful in both the pharmaceutical and feed supplement industries and solves a long-standing problem of these industries. By the use of my method more concentrated solutions of riboflavin may be incorporated in animal feed supplements. Likewise, in producing parenteral vitamin solutions for pharmaceutical use, the ability to retain a large, standardized riboflavin solution for as long as 24 hours without the danger of the riboflavin concentration changing due to crystallization enables the laboratory to prepare a greater variety of multi-vitamin solutions and concentrates which incorporate riboflavin from a standard solution.

My invention can be understood more completely by reference to the following specific examples.

EXAMPLE I

Random samples of riboflavin purchased on the open market were tested at various concentrations for stability against crystallization for a 24 hour period. The calculated amount of riboflavin required to produce the desired concentration after acidification was dissolved in 200 ml. of 0.1 N sodium hydroxide solution and the solution diluted with water to a volume of 1 liter. The diluted solution was then acidified with concentrated hydrochloric acid to a pH of from 3.0 to 5.2 and the solution held in a dark room at approximately 25° C. for a 24 hour period. The degree of crystallization in each concentration was recorded four times during the period. The results are summarized in Table I below.

with water so that after acidification the concentration of riboflavin would equal 1,000 mg. per liter. The diluted solutions were acidified with .1 N hydrochloric acid and held in a dark room for up to seven days at approximately 25° C. The degree of crystallization of each sample was recorded after 24 hours and 3 days. Those samples still free of any haze or crystallization at 3 days were observed after 7 days and their condition recorded. The results are summarized in Table II below.

*Table II*

[Solution stability at 1 gram per liter]

| Ribo., Batch | Diluted Base Normality | pH After Acidification | Degree of Crystallization After— | | |
|---|---|---|---|---|---|
| | | | 24 Hours | 3 Days | 7 Days |
| A | .02 | 5.8 | None | Faint haze | |
| B | .02 | 5.7 | do | Trace | |
| C | .02 | 5.7 | do | Faint haze | |
| D | .02 | 4.6 | do | Trace | |
| E | .02 | 4.7 | do | Faint haze | |
| F | .02 | 6.2 | do | do | |
| G | .01 | 6.0 | do | do | |
| H | .01 | 6.0 | do | do | |
| I | .01 | 6.2 | do | None | Faint haze. |
| J | .01 | 5.2 | do | do | None. |
| K | .01 | 6.0 | do | Moderate | |
| L | .01 | 5.8 | do | None | Faint haze. |
| M | .01 | 4.9 | do | do | None. |
| N | .01 | 3.5 | do | Faint haze | Moderate. |
| O | .02 | 5.6 | do | Trace | |
| P | .02 | 5.3 | do | Faint haze | |
| Q | .02 | 4.8 | do | Faint trace | |
| R | .02 | 5.4 | do | None | Faint trace. |
| S | .02 | 4.7 | do | do | None. |
| T | .02 | 3.9 | do | do | |
| U | .02 | 5.4 | do | do | Faint trace. |
| V | .02 | 5.6 | do | Trace | |
| W | .02 | 3.8 | do | Faint trace | |
| X | .02 | 4.6 | do | Trace | |
| Y | .02 | 5.4 | do | Faint trace | |

The foregoing examples are by way of illustration only, and I do not intend to be limited to the concentrations or reagents shown in the specific examples. The scope of my invention is as set forth in this specification and the appended claims.

Now having described my invention what I claim is:

1. In a process for increasing the stability against crystallization and the degree of supersaturation of supersaturated solutions of riboflavin, the steps which comprise dissolving riboflavin at a temperature not in excess of 35° C. in an aqueous solution of a base selected from

*Table I*

| Riboflavin, Type | Conc., mg./l. | pH on Acidification | Degree of Crystallization After— | | | |
|---|---|---|---|---|---|---|
| | | | 1 Hour | 4 Hours | 7 Hours | 24 Hours |
| A | 1,000 | 3.7 | Faint haze | Moderate | Large | Very large. |
| | 800 | | None | Small | Small | Large. |
| | 600 | | do | None | Faint haze | Trace. |
| | 500 | | do | do | None | None. |
| B | 1,000 | 3.0 | None | Trace | Moderate | Very large. |
| | 800 | | do | None | Small | Moderate. |
| | 600 | | do | do | Faint haze | None. |
| | 500 | | do | do | None | Do. |
| B | 1,000 | 3.6 | None | Moderate | Large | Very large. |
| | 800 | | do | Trace | Small | Large. |
| | 600 | | do | None | None | Trace. |
| | 500 | | do | do | do | None. |
| B | 1,000 | 3.6 | None | Trace | Small | Very large. |
| | 800 | | do | None | Trace | Small. |
| | 600 | | do | do | None | None. |
| | 500 | | do | do | do | Do. |
| C | 1,000 | 5.2 | None | None | None | Trace. |
| C | 1,000 | 4.7 | do | do | do | None. |

EXAMPLE II

Random samples from a number of batches of type A riboflavin were tested at a concentration of 1,000 mg. per liter for stability against crystallization for several days. Weighed samples were dissolved in 100 ml. or 200 ml. of 0.1 N sodium hydroxide solution and the solution diluted the group consisting of alkali metal hydroxides, ammonium hydroxide, and aliphatic amines, said base being used in a concentration at which substantial destruction of riboflavin does not take place, said riboflavin being dissolved in an amount sufficient to produce a concentration of from 150% to 1000% by weight, based on the weight of riboflavin in a saturated solution thereof in water at 25° C., adjusting the pH of the solution to a pH value of from about 3.0 to about 6.5 with an acid, and maintaining the said supersaturated solution at a temperature of from about 20° to about 35° C.

2. In a process for increasing the stability against crystallization and the degree of supersaturation of supersaturated aqueous solutions of riboflavin, the steps which comprise dissolving type A riboflavin at a temperature not in excess of 35° C. in an aqueous solution of a base selected from the group consisting of alkali metal hydroxides, ammonium hydroxide, and aliphatic amines, said base being used in a concentration at which substantial destruction of riboflavin does not take place, said riboflavin being dissolved in an amount sufficient to produce a concentration of from about 150% to about 1000% by weight, based on the weight of riboflavin in a saturated solution thereof in water at 25° C., adjusting the pH of the solution to a pH value of from about 3.0 to about 6.5 with an acid, and maintaining the said supersaturated solution at a temperature of from about 20° to about 35° C.

3. In a process for increasing the stability against crystallization and the degree of supersaturation of supersaturated aqueous solutions of riboflavin, the steps which comprise dissolving type B riboflavin, at a temperature of not more than 35° C. in an aqueous solution of a base selected from the group consisting of alkali metal hydroxides, ammonium hydroxide, and aliphatic amines, said base being used in a concentration at which substantial destruction of riboflavin does not take place, said riboflavin being in an amount sufficient to produce a concentration of from about 150% to about 300% by weight, based on the weight of riboflavin in a saturated solution thereof in water at 25° C., adjusting the pH of the solution to a pH value of from about 3.0 to about 6.5 with an acid, and maintaining the said supersaturated solution at a temperature of from about 20° to about 35° C.

4. In a process for increasing the stability against crystallization and the degree of supersaturation of supersaturated aqueous solutions of riboflavin, the steps which comprise dissolving type C riboflavin at a temperature not in excess of 35° C. in an aqueous solution of a base selected from the group consisting of alkali metal hydroxides, ammonium hydroxide, and aliphatic amines, said base being used in a concentration at which substantial destruction of riboflavin does not take place, said riboflavin being dissolved in an amount sufficient to produce a concentration of from about 150% to about 400% by weight, based on the weight of riboflavin in a saturated solution thereof in water after standing for a period of at least 30 minutes at 25° C., adjusting the pH of the solution to a pH value of from about 3.0 to about 6.5 with an acid, and maintaining said supersaturated solution at a temperature of from about 20° to about 35° C.

5. In a process for increasing the stability against crystallization and the degree of supersaturation of supersaturated aqueous solutions of riboflavin, the steps which comprise dissolving type A riboflavin at a temperature not in excess of 35° C. in a .01 to 5.0 N aqueous solution of sodium hydroxide, said riboflavin being dissolved in an amount sufficient to produce a concentration of from about 150% to about 1000% by weight based on the weight of riboflavin in a saturated solution thereof in water at 25° C., adjusting the pH of the solution to a pH value of from about 3.0 to about 6.5 with an acid, and maintaining said supersaturated solution at a temperature of from about 20° to about 35° C.

6. In a process for increasing the stability against crystallization and the degree of supersaturation of supersaturated aqueous solutions of riboflavin, the steps which comprise dissolving type B riboflavin at a temperature not in excess of 35° C. in a 0.01 to 5.0 N aqueous solution of sodium hydroxide, said riboflavin being dissolved in an amount sufficient to produce a concentration of from about 150% to about 300% by weight, based on the weight of riboflavin in a saturated solution thereof in water at 25° C., adjusting the pH of the solution to a pH value of from about 3.0 to about 6.5 with an acid, and maintaining the said supersaturated solution at a temperature of from about 20° to about 35° C.

7. In a process for increasing the stability against crystallization and the degree of supersaturation of supersaturated aqueous solutions of riboflavin, the steps which comprise dissolving type C riboflavin at a temperature not in excess of 35 C. in a .01 to 5.0 N aqueous solution of sodium hydroxide, said riboflavin being dissolved in an amount sufficient to produce a concentration of from about 150% to about 400% by weight, based on the weight of riboflavin in a saturated solution thereof in water after standing for a period of at least 30 minutes at 25° C., adjusting the pH of the solution to a pH value of from about 3.0 to about 6.5 with an acid, and maintaining said supersaturated solution at a temperature of from about 20° to about 35° C.

References Cited in the file of this patent

UNITED STATES PATENTS 2,421,142    Dale _____ May 27, 1947